June 13, 1950 E. E. VINCENT ET AL 2,511,554
LIQUID DISPENSER DEVICE AND DEAERATOR
Filed Jan. 10, 1947 4 Sheets-Sheet 1

Inventors:
Edwin E. Vincent
Bertram P. Pond
Warren H. DeLancey
By Chester A. Williams
Attorney Inventors:
Edwin E. Vincent
Bertram P. Pond
Warren H. DeLancey
By Chester A. Williams
Attorney Inventors:
Edwin E. Vincent
Bertram P. Pond
Warren H. DeLancey
By
Chester A. Williams
Attorney Patented June 13, 1950

2,511,554

UNITED STATES PATENT OFFICE 2,511,554

LIQUID DISPENSER DEVICE AND DEAERATOR

Edwin E. Vincent and Warren H. De Lancey, Springfield, Mass., assignors to Engineering Products, Inc., Springfield, Mass., a corporation of Massachusetts Application January 10, 1947, Serial No. 721,264

3 Claims. (Cl. 183—2.5)

1

The present invention relates to liquid dispenser devices and more particularly to that type of a liquid dispenser device which is adapted to supply a substantially constant flow of air-free liquid.

The invention, while capable of other applications, is particularly designed for drawing a supply of liquid from a liquid source, removing the air from the liquid, and then forcing the liquid in a substantially constant stream to a desired location. Such liquid dispensing devices are used particularly in gasoline stations for supplying gasoline to motor cars, and when so employed they are usually associated with liquid flow meters through which the stream of gasoline is forced for the purpose of measuring the quantity of liquid supplied at any given time.

It is a primary object of the present invention to provide a liquid dispenser device which, although highly efficient in operation, will be extremely compact to the end that the entire unit will require a minimum of storage space.

A further object of the present invention is to provide a unit of the hereinabove noted type which will be so designed that it will require a minimum of machine operations for the fabrication of the same, thereby to make for inexpensive manufacture.

Another object of the present invention is to provide such a liquid dispenser device with means for automatically priming the pump thereof so that upon the starting up of the pump it will be supplied with liquid immediately.

Still another object of the present invention is to provide such a liquid dispenser device with a pump-priming valve which will operate efficiently under the divers fluid pressure conditions obtained in such a dispenser device.

Yet another object of the present invention is to provide a dispenser of the present type with a motor and pump combination, which may be removably secured to the dispenser housing as a unit and which at the same time will be so designed that the pump portion thereof may be removed from the housing independently of the motor to which the pump is normally attached.

With the above and other objects in view as will hereinafter appear, the invention comprises the devices, combinations and arrangements of parts hereinafter set forth and illustrated in the accompanying drawings of a preferred embodiment of the invention from which the several features of the invention and the advantages attained thereby will be readily understood by those skilled in the art.

2

In the accompanying drawings:

Fig. 11 represents an enlarged front view of the float-valve unit.

Fig. 12 represents a side view of the valve unit disclosed in Fig. 11.

Fig. 13 represents a bottom view of the valve unit as disclosed in Fig. 11.

Fig. 14 represents an enlarged view of a stub shaft upon which the valve arm is pivotally mounted.

Fig. 15 represents, in enlarged scale, a front view of a valve button.

Fig. 16 represents a side view of the button disclosed in Fig. 15.

Figure 1:
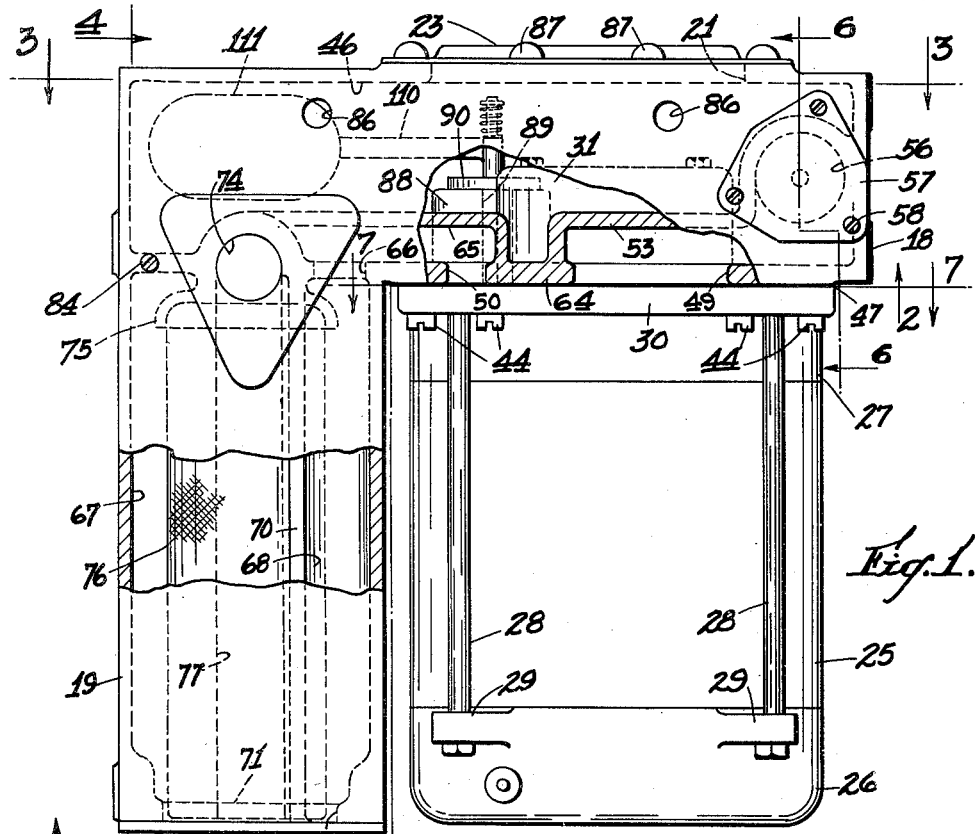
Fig. 1 represents a top plan view of the present dispenser device.
Figure 2:
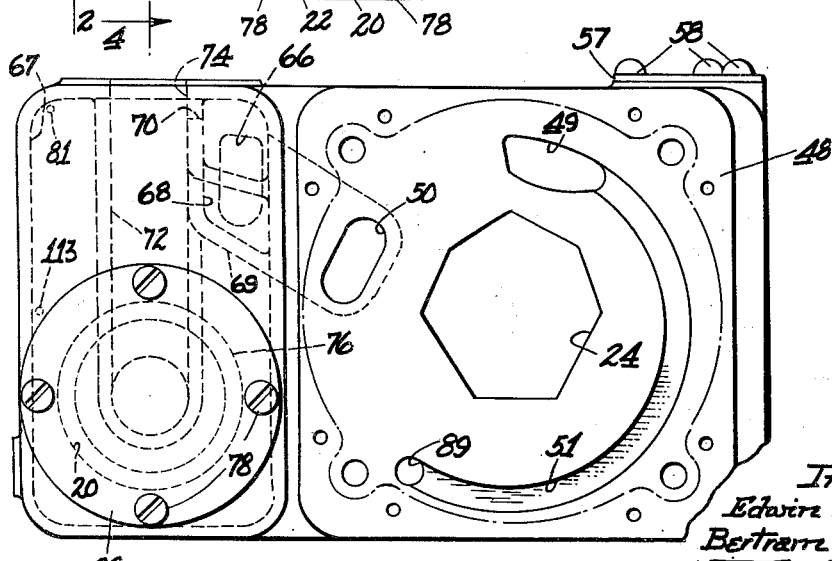
Fig. 2 represents a rear end view of the dispenser device taken substantially along line 2—2 of Fig. 1.

Referring particularly to Fig. 1, the present liquid dispenser device comprises a substantially L-shaped unitary housing defined by arms 18 and 19. This housing comprising the arms 18 and 19 is adapted to be cast as a single unit in a manner such that the arms will be substantially hollow. Referring particularly to Figs. 1, 2, 3, and 5, the free end of the arm 19 is formed with a substantially circular aperture 20 formed therein and the arm 18 has formed at the front side thereof a substantially rectangular opening 21, which openings are adapted to be closed over by means of removable cover plates 22 and 23, respectively. Referring particularly to Fig. 2, the rear side of the arm 18 is formed with an aperture 24 which is disposed in opposed relation to the aperture 21 formed in the opposite side of the arm 18.

For the purpose of forcing liquid through the present housing unit there is provided a typical electric motor which comprises a substantially cylindrical body portion 25 which is disposed between opposite end bells 26 and 27. These end bells 26 and 27 are held in place over the respective end portions of the member 25 by means of stay bolts 28, 28 which pass through lugs 29, 29 formed in the end bell 26 thereby to be threaded into a substantially rectangular shaped face plate 30 formed upon the end bell 27. Referring particularly to Figs. 1, 7, 8, 9 and 10, the present invention contemplates the provision of a liquid pump which is adapted to be removably secured upon the face plate 30 of the electric motor. This liquid pump is of the rotary vane type and it comprises a body portion 31 which has a front plate 32 and a back plate 33 secured thereto in the usual manner. The back plate 33 of this pump is provided with the usual arcuate pump intake and delivery ports 34 and 35 respectively. Also formed in the plate 33 is a shaft-receiving aperture 36 and a plurality of bolt holes 37, 37. Provided on the face portion of the plate 30 are a plurality of threaded apertures 38, 38 which are adapted to receive bolts 39 which pass through the pump casing thereby to secure the pump against the plate 30 of the motor. Projecting through the plate 30 is the usual rotary shaft 40 of the motor which is adapted to extend into the pump unit for the purpose of operating the same. The end portion of the shaft 40 may be provided with a keyway 41 for the purpose of providing means whereby the pump rotor (which is not disclosed herein) may be operatively connected to the shaft.

Figure 7:
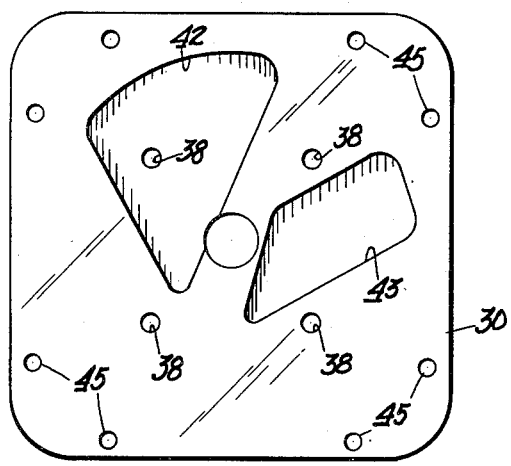
Fig. 7 represents an end view of the motor unit taken substantially along the line 7—7 of Fig. 1.
Figure 8:
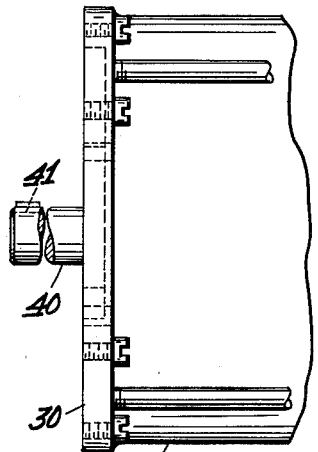
Fig. 8 represents a fragmentary side view of the motor unit disclosed in Fig. 7.
Figure 9:
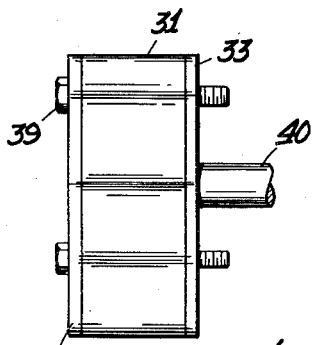
Fig. 9 represents a side view of the pump unit which is normally attached to the motor unit as disclosed in Fig. 1.
Figure 10:
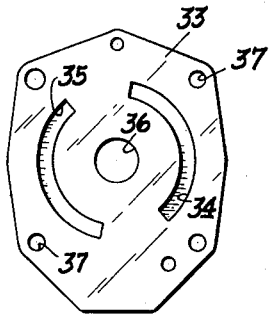
Fig. 10 represents a face view of the pump unit disclosed in Fig. 9.

Referring particularly to Fig. 7, the face of the motor plate 30 is provided with recesses 42 and 43 which are adapted to be disposed in register with the ports 34 and 35 respectively of the pump unit whenever the latter is secured in its operative position over the plate 30. By referring to Fig. 3 it is to be understood that the recesses 42 and 43 each extends beyond the confines of the pump plate 33 thereby to afford openings through which the liquid may be circulated to and from the pump unit. Thus, it is to be understood that the pump unit is removably secured to the electric motor and when thus secured in its operative position the pump and motor form a unitary combination which may be removably secured to the arm 18 of the housing unit.

Referring particularly to Figs. 1 and 2, the motor and pump unit is adapted to be secured to the arm 18 by means of a plurality of bolts 44, 44 which pass through apertures 45, 45 formed in the motor plate 30 thus to be threaded directly into the rear side of the housing arm 18. When thus positioned against the arm 18 it is to be understood that the pump unit will be received through the aperture 24 provided in the arm 18 thereby to be positioned substantially within a hollow chamber 46 provided in the arm 18. A usual type gasket 47 may be disposed between the plate 30 and the machined portion 48 of the arm 18 thereby to prevent the egress of liquids therebetween. Referring to Fig. 2, the rear side of the arm 18 is provided with apertures 49 and 50 which will be positioned in register with the outer portions of the recesses 42 and 43 whenever the motor is positioned against the arm 18. Thus it is to be understood that the aperture 49 functions as an intake port and the aperture 50 functions as a delivery port to the end that the pump unit may draw liquids through port 49 thereby to force liquids out through port 50. Also formed in the back of the arm 18 is an arcuate groove 51 which at its top portion communicates with the port 49 for reasons to be hereinafter set forth.

Figure 3:
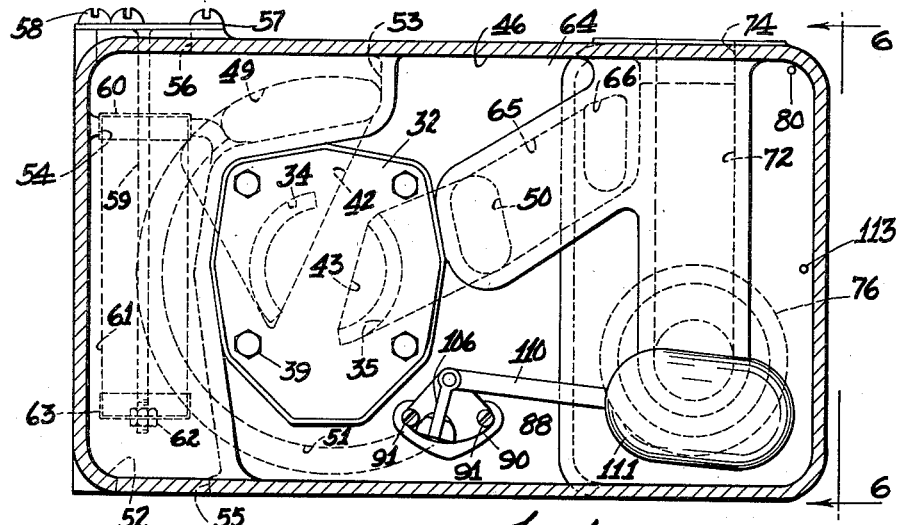
Fig. 3 represents a front end view of the present device, partly in section, taken substantially along the line 3—3 of Fig. 1.
Figure 6:
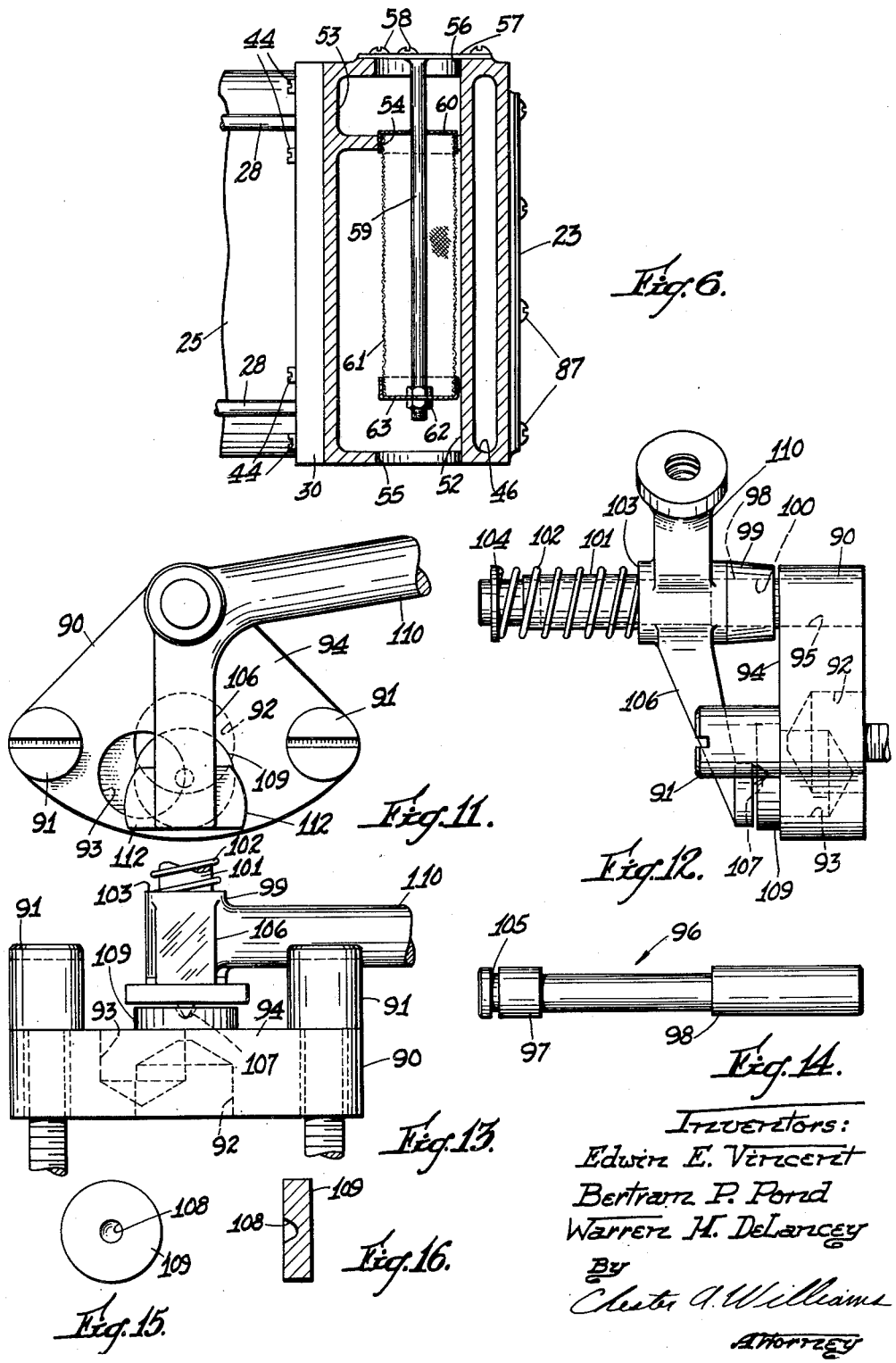
Fig. 6 represents a side view of the dispenser unit, partly in section, taken substantially along the line 6—6 of Fig. 1.

Referring to Figs. 1, 3, and 6, the chamber 46 of the arm 18 has formed integrally therein a substantially vertically disposed chamber 52 which opens directly into an upper horizontal chamber 53 by way of an aperture 54 and which, in a similar fashion, opens at the bottom portion of the arm 18 as at 55. As may best be seen from Figs. 3 and 6, there is provided in the upper chamber 53 an aperture 56 which is disposed in substantial alignment with the apertures 54 and 55. The horizontal chamber 53 communicates directly with the aperture 49 formed in the rear face of the arm 18. The opening 56 in the top portion of the arm 18 is adapted to be closed over by means of a cover plate 57 secured to the arm 18 by means of screws 58, 58. Thus it is to be understood that the lower opening 55 is in direct communication with the intake port 49 through the chambers 52 and 53. Therefore, the opening 55, in the present invention, is adapted to be connected directly to a source of liquid supply. However, it order to prevent any foreign matter from entering the pump unit along with the liquid the present invention contemplates the use of a screen or strainer unit through which all of the liquid must pass before gaining entrance into the pump proper. In its preferred form the present strainer unit is secured directly to the plate 57 and may be removed from the arm 18 whenever the plate 57 is released from the arm by the removal of the screws 58. More specifically, the plate 57 has depending therefrom a rod 59 to the upper portion of which is rigidly secured a dished perforated end cap 60 which is adapted to be received snugly within the walls of the aperture 54 and which is also adapted to receive the upper portion of a cylindrical screen element 61. The lower portion of the rod 59 is threaded for the purpose of receiving a nut 62 which functions to force a second dished end cap 63 against the lower portion of the screen 61 thereby to position the screen in its proper location. Since the upper cap 60 is received snugly within the aperture 54 it is to be understood that any and all liquids which pass upwardly through the chamber 52 must of necessity pass through the screen 61 before entering the chamber 53 and consequently into the pump unit.

Figure 4:
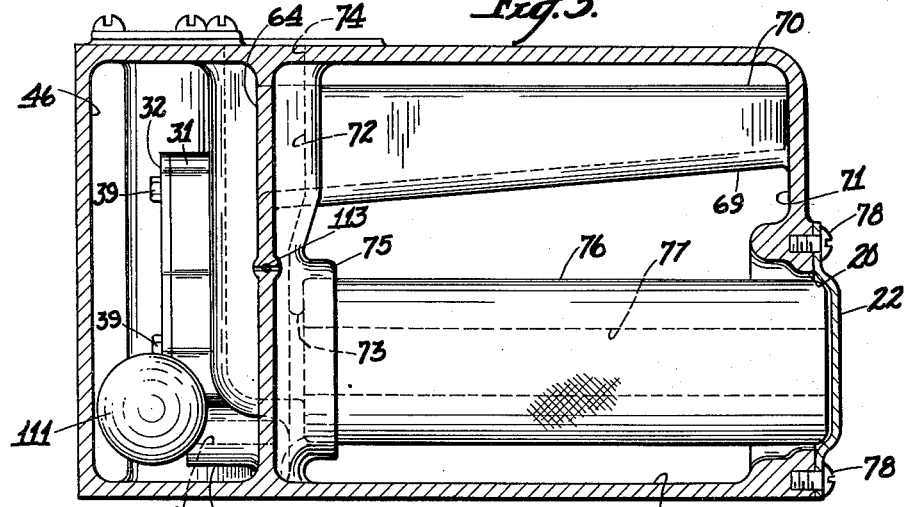
Fig. 4 represents a side view of the dispenser unit, partly in section, taken substantially along the line 4—4 of Fig. 1.

From the above it is to be understood that the pump unit, when operative, is adapted to draw liquid into the housing unit by way of the aperture 55, through a screen 61 and finally into the pump intake port 34 by way of the port 49 and the motor plate recess 42. After receiving the liquid into its low pressure side the pump will be effective to force this liquid out through its delivery port 35 and into the motor plate recess 43 which will deliver the same to the delivery port 50 formed in the back face of the arm 18. Referring particularly to Figs. 1, 3, and 4, a back wall 64 of the chamber 46 has formed integrally therewith a delivery conduit 65 which communicates directly with the delivery port 50 formed in the rear wall of the housing arm 18. This delivery conduit 65 extends along the wall 64 thereby to communicate directly, by way of an opening 66 formed in the wall 64, with a hollow chamber 67 formed within the arm 19. Thus, the liquid coming from the high pressure side of the pump unit will be delivered through the port 50 and into the chamber 67 by way of the delivery conduit 65 and the wall opening 66.

Referring particularly to Figs. 1, 2, 3, and 4, the chamber 67 of the arm 19 has formed integrally therewith a trough 68 which is defined by a curved wall member 69. The top horizontal portion 70 of the wall 69 is spaced from the upper portion of the chamber 67 and extends longitudinally of the chamber from the wall 64 to a wall 71 which closes over the free end portion of the arm 19. The opening 66 in the wall 64 communicates directly with this trough 68 to the end that the liquid which is pumped into the chamber 67 through the opening 66 will gush into the trough 68 thereby to spill over the upper portion 70 of the trough wall. This wall portion 70, therefore, functions as a dam for the purpose of forcing the liquid to flow in a thin stream so that air which is entrapped in the liquid may have an opportunity to escape therefrom.

After the liquid flows over the dam 70 it will flow into the chamber 67 proper and thus fill this chamber with the exception of the top portion thereof which will normally contain air brought into the chamber by way of the liquid. By referring to Figs. 1, 2, 3, and 4, it will be understood that the wall 64 which extends between the chambers 46 and 67 has formed therein a substantially vertically disposed cylindrical conduit 72 which at its lower end communicates with the chamber 67 by means of an aperture 73. The upper portion of this conduit 72 opens directly out at the upper portion of the housing as at 74. Surrounding the opening 73 is an annular shaped wall portion 75 which extends outwardly from the wall 64 for the purpose of receiving therein one end of an air separator or filter which, in the present invention, takes the form of a substantially cylindrical cylinder 76. This cylinder 76 may be formed as a cop of tightly wound thread having a central aperture defined by a cylindrical wire screen 77 positioned therein. This screen 77 will normally be positioned in register with the aperture 73 which communicates directly with the delivery conduit 72. The air filter extends substantially longitudinally of the arm 19 and its other end is disposed in register with the opening 20 formed in the free end portion of the arm 19. Thus it may be understood that the primary function of this opening 20 is to permit the air filter 76 to be inserted into and to be removed from the arm 19. Referring particularly to Fig. 4, the end plate 22 is dished outwardly so that it may receive one end of the air filter 76 thereby to retain the same in its proper position. Bolts 78, 78 retain the end plate 22 in its proper location against the free end portion of the arm 19. The liquid which gains entrance into the hollow chamber 67 of the arm 19 must pass through the filter 76 before gaining entrance into the delivery conduit 72 and it has been found that such air-filters are well adapted for removing any and all air which may be entrapped in the liquid, it being understood that such a filter permits only the liquid to pass therethrough thereby leaving bubbles of air on the outer periphery of the filter. These air bubbles will ultimately break away from the filter and rise to the upper portion of the chamber 67. By the use of the dam 70 and the filter 76 the present construction prevents any air which may be initially entrapped in the liquid from passing into the delivery conduit 72. This delivery conduit 72 at its upper portion 74 is adapted to have secured thereto a conduit for conducting the liquid to any desired location.

As the present pumping unit continues to supply liquid to the chamber 67 it will be understood that there will be accumulated in the top portion of this chamber a supply of air which must automatically be removed. In order to remove this air the present invention contemplates the use of an air-escape conduit positioned in the wall 64 so that it may communicate with the chambers 67 and 46 for the purpose of conducting the air from the former to the latter chamber.

Figure 17:
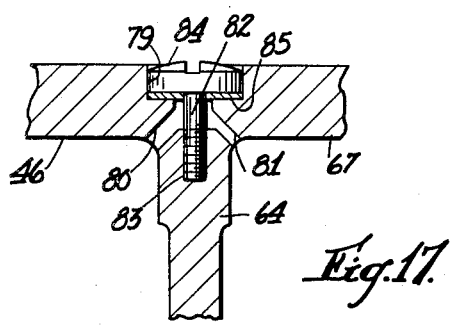
Fig. 17 represents an enlarged view of a typical orifice which is used in the present dispensing unit.

Referring particularly to Figs. 1, 4, and 17, the present air-escape conduit is formed by providing the top wall portion of the arm 19 with a stepped aperture 79 at a point directly over the wall 64. After this aperture 79 has been provided in the top wall, apertures 80 and 81 may readily be drilled to the end that the chambers 67 and 46 will be placed in communication with each other by way of the aperture 79. A screw 82 may be threaded directly within the upper portion of the wall 64 as at 83 so that the head portion 84 of this screw may be snugly received within the upper portion of the stepped aperture 79. A gasket 85 may be placed beneath the head 84 thus to prevent the escape of fluids out through the aperture 79 and past the screw head 84.

From the above it will be understood that the air which is entrapped and compressed over the head of liquid contained within the chamber 67 will be forced into the chamber 46 by way of the hereinabove described air-escape conduit. It is, of course, expected that a small quantity of liquid will also pass into the chamber 46 along with the air but this escape of liquid will not adversely affect the efficiency of the dispenser device. By referring to Fig. 1 it will be seen that the upper wall portion of the arm 18 is provided with a plurality of air-escape openings, 86, 86 which communicate directly with the chamber 46. Thus, the air which escapes from the chamber 67 into the chamber 46 may readily pass from the latter chamber through these escape openings. However, the liquid which passes from the chamber 67 to the chamber 46 will accumulate within the lower portion of the chamber 46. With the exception of the openings 86, 86, the chamber 46 is made substantially liquid-tight by means of the cover plate 23 which is secured directly over the opening 21 by means of a plurality of screws 87, 87.

Referring particularly to Figs. 1, 3, and 4, the inner portion of the back wall 64 of the chamber 46 is provided with a boss 88 which projects into the chamber 46 and which is provided with a substantially horizontally disposed aperture 89 opening directly upon the outside of wall 64 of the arm 18 so as to communicate directly with the lower portion of the arcuate groove 51. The outer portion of the boss 88 has a smooth machined surface upon which is adapted to be secured a substantially triangular shaped valve plate 90 by means of a pair of screws 91, 91. This valve plate is provided with an aperture 92 which opens upon the back face of the plate 90 thereby to register with the conduit 89. Communicating with the aperture 92 is a similar aperture 93 formed in the forward face 94 of the valve plate. Thus, the chamber 46 communicates with the groove 51 provided in the back face of the arm 18 by means of the valve plate apertures 92 and 93. The upper portion of the valve plate 90 is provided with a bore 95 which is adapted to have a pivot pin 96 force-fitted therein. The major portion of the pivot pin 96 projects outwardly from the valve plate and pivotally mounted upon spaced shoulders 97 and 98 of the pin is a base member 99 of a valve unit. A bore 100 provided in the base portion 99 of the valve is slidingly fitted upon the shoulders 97 and 98 of the pin 96 to the end that the valve unit may freely pivot about this pin. Extending outwardly from the base member 99 of the valve is a reduced shoulder portion 101 upon which is mounted a coil spring 102 one end of which bears directly against a shoulder 103 of the valve unit. The other end of the spring 102 bears against a snap ring 104 which is disposed within a groove 105 provided in the outer end portion of the pin 96. This spring 102, therefore, is effective to bias the entire valve unit against the face 94 of the valve plate 90. Depending downwardly from the base 99 of the valve unit is an arm 106 the lower portion of which is provided with a substantially horizontally disposed member 107 which is adapted to be received within a conical recess 108 formed centrally within a disk 109. From the above it may be understood that the spring 102 not only biases the valve unit towards the valve plate 90 but at the same time it is effective to bias the disk 109 against the face 94 of the valve plate 90. The diameter of the disk 109 is slightly greater than the diameter of the aperture 93 so that whenever the disk 109 is positioned axially of the aperture 93 it will function to close off the same from communication with the chamber 46.

Projecting outwardly from the base 99 of the valve unit is a second arm 110 upon the outer end portion of which is secured a hollow float 111. In its preferred form this valve unit has the face 94 of the valve plate 90 highly polished or else this face may be coated with a material such as chromium. Also, the disk 109 may be formed of carbon to the end that a minimum of frictional drag is set up between the disk 109 and the valve plate surface 94 as the disk traverses over this surface. Referring particularly to Fig. 3, it is to be understood that this valve unit is so arranged that whenever the float member 111 thereof is in its lowest position the disk 109 will be disposed directly over the aperture 93 thereby to cut off communication of the aperture with the chamber 46. It will also be understood that whenever the liquid level within the chamber 46 rises to a predetermined level the float 111 will rise along with the liquid to the end that the valve will pivot about its pin 96 thereby to expose the opening 93. The screws 91, 91 which secure the valve plate 90 against the boss 88 also function as stops to prevent the valve from swinging through an unnecessarily wide arc. To this end the lower portion of the arm 106 is provided with a pair of lugs 112, 112 each of which will engage an appropriate one of the screws 91, 91 thereby to prevent the valve from over traveling.

Since the valve aperture 93 is in direct communication with the pump intake port 34, by way of the groove 51, it is to be understood that whenever the float 111 rises to a predetermined level the pump will immediately be effective to draw the liquid out of the chamber 46. Thus, this float valve unit functions automatically in conjunction with the pump unit to scavenge the liquid from the chamber 46 whenever the liquid level therein reaches a predetermined point. The liquid contained within the chamber, as hereinabove noted, comes, in part, from the chamber 67 by way of the air-escape conduit which was hereinabove described.

Referring particularly to Figs. 2, 3, and 7, it is to be understood that the recess 42 formed in the motor plate 30 defines, in conjunction with the back side of the arm 18, a chamber which receives the incoming liquid through the aperture 49 provided in the housing wall 64. It is to be understood that whenever the motor is deenergized the pumping unit will come to rest and thereafter it will be found that this cavity 42 will be filled with liquid thereby to function as a pump-priming cavity or chamber. Thus, whenever the pump is again made active it will have available for the priming thereof a quantity of liquid which has been stored for such purposes in this cavity 42.

It has been found, however, that it is sometimes necessary to provide such a dispenser unit with a rather great quantity of priming liquid and, therefore, the hereinabove noted priming chamber will not be adequate to contain a sufficient quantity 27 of priming liquid. The present dispenser unit overcomes this disadvantage as it is provided with a priming conduit 113 disposed between the chambers 46 and 67 at a level substantially below that of the air-escape conduit. Referring particularly to Figs. 3, and 4, there is provided in the outer side wall of the arm 19 at a point adjacent one end of the wall 64 a priming conduit of a design substantially similar to that of the hereinabove described air-escape conduit. Thus, it will be understood that this priming conduit will be effective to deliver liquid from the chamber 67 to the chamber 46 whenever the pump unit ceases to operate and, therefore, it will be effective to build up within the chamber 46 a supply of liquid which will be available to the pump whenever the same is started up. Of course, the priming conduit will also be effective to deliver this liquid to the chamber 46 during the operation of the pump but this liquid will be removed from the chamber so that it will have no deleterious effect upon the overall efficiency of the unit. By thus providing this priming conduit the pump will always have an adequate supply of liquid within the chamber 46 for use by the pump whenever the same is put into operation after being inactive for any appreciable period of time. This priming aperture 113 is disposed at such a level that the liquid will be built up within the chamber 46 at a level such that the float 111 will be effective to rise to a height sufficient to place the aperture 93 in direct communication with the low pressure side of the pump unit. Therefore, whenever the pump unit is started up after a period of inactivity, it will be assured of an adequate supply of priming fluid which it will draw from the chamber 46 and into the intake port 35 by way of the groove or conduit 51.

Figure 5:
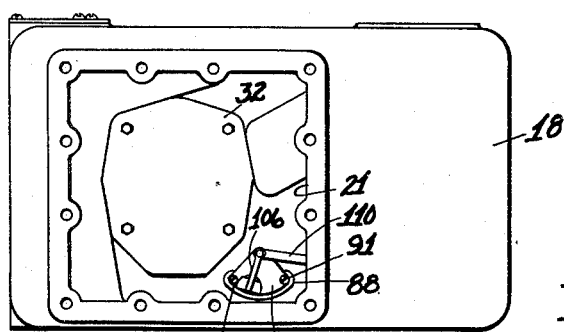
Fig. 5 represents, in reduced scale, a front end view of the present unit with the cover plate removed.

Referring particularly to Figs. 1, 3, and 5, it will be understood that the opening 21 within the forward face of the arm 18 is so disposed that the pump unit may be removed from the motor without disturbing the latter unit. In order to so remove the pump unit it is merely necessary to remove the screws 39 thereby permitting an operator to remove the plate 32 from the pump so that the pump rotor may be detached from the motor shaft and thus the entire pump unit may be withdrawn through the opening 21 after the cover plate 23 has been taken off the housing unit. In this connection it is also to be understood that this opening 21 in the arm 18 is so disposed that the entire valve unit may also be removed from the chamber 46. From the above it is clear that the present housing unit is so designed that the various movable elements thereof may be readily inserted into or removed therefrom for the purpose of assembling or repairing the same. This feature will make for inexpensive manufacture and upkeep of such dispenser devices.

We claim:

1. A liquid dispenser device comprising, a substantially L-shaped housing having first and second chambers each formed in a respective one of the two arm portions of said housing, said second chamber having an air-escape opening in the top portion thereof, an electric motor removably secured to that housing arm containing said second chamber and disposed in parallel and adjacent relation with the other of said arms, a liquid pump disposed within said second chamber and operatively connected to said motor, means for delivering liquid to the low pressure side of said pump, means for conducting liquid from the high pressure side of said pump to said first chamber, means disposed within said first chamber for removing air from the liquid, conduit means connecting said first and second chambers for conducting the air removed from said liquid to said second chamber, and conduit means connected with said first chamber for delivering liquid to the outside of said housing.

2. A liquid dispenser device comprising, a substantially unitary L-shaped housing having first and second chambers each formed in a respective one of the two arm portions of said housing, said device when operative being adapted to be disposed with its arms lying substantially in a horizontal plane, said second chamber having an air-escape opening in the top portion thereof, an electric motor removably secured to that arm containing said second chamber and disposed in parallel and adjacent relation with the other of said arms, a liquid pump disposed within said second chamber and operatively connected to said motor, said arm being provided with an access opening at the side of said second chamber directly opposite to said pump so that the latter may be removed from said motor through said opening, a cover plate removably secured over said access opening, means for delivering liquid to the low pressure side of said pump, means for conducting liquid from the high pressure side of said pump to said first chamber, means in the form of a dam extending longitudinally of and within said first chamber for removing air from said liquid, an air-escape conduit connecting the upper portions of said chambers together for conducting the air removed from the liquid to said second chamber, a fluid escape conduit connecting said first and second chambers at a level substantially below the level of said air-escape conduit, and means including a valve disposed within said second chamber for automatically connecting said second chamber with the low pressure side of said pump whenever the liquid level within said second chamber rises above a predetermined point.

3. A liquid dispenser device comprising, a hollow L-shaped housing having first and second chambers each formed in a respective one of the two arm portions thereof, said device being adapted to be normally disposed with its arms lying substantially in a horizontal plane, said housing including a substantially flat and vertical wall section disposed at the inner side of that arm containing said second chamber, said wall section extending into said housing at the juncture of said arms thereby to separate said first and second chambers, an electric motor removably secured upon the outside of said wall section so as to be diposed in parallel and adjacent relation with that arm which contains said first chamber, a liquid pump disposed within said second chamber and operatively connected to said motor, said housing being provided with an access opening at the side of said second chamber directly opposite to said pump so that the latter may be removed from said motor through said opening, a cover plate removably secured over said access opening, conduit means formed integrally within said wall section for delivering liquid to the low pressure side of said pump and for conducting liquid from the high pressure side of said pump to said first chamber, means in the form of a dam extending longitudinally of and within said first chamber for removing air from said liquid, conduit means formed integrally within said wall section for delivering liquid from the bottom portion of said first chamber to the outside of said housing, an air-escape conduit formed within said wall section and connecting the upper portions of said first and second chambers together for conducting the air removed from the liquid to said second chamber, an air vent formed in the top of said second chamber, a liquid-escape conduit formed in said wall section and connecting said first and second chambers together at a level substantially below that of said air-escape conduit for delivering liquid from said first to said second conduits during the operation of said pump, conduit means formed integrally within said wall section and connecting the lower portion of said second chamber with the low pressure side of said pump, and means including a float valve connected with said last mentioned conduit means and disposed within said second chamber for automatically connecting and disconnecting such conduit means to and from said second chamber as the liquid level within such chamber respectively rises and falls above and below a predetermined point.

EDWIN E. VINCENT.
WARREN H. DE LANCEY.

REFERENCES CITED

The following references are of record in the file of this patent:

UNITED STATES PATENTS

| Number | Name | Date |
|---|---|---|
| 1,095,463 | Kieser | May 5, 1914 |
| 2,020,112 | Fagan | Nov. 5, 1935 |
| 2,258,497 | Jauch et al. | Oct. 7, 1941 |
| 2,330,703 | Grise | Sept. 28, 1943 |
| 2,423,439 | De Lancey | July 8, 1947 |